(12) United States Patent
Pellymonter (10) Patent No.: US 7,992,603 B2
(45) Date of Patent: Aug. 9, 2011

(54) SAW SPEED READINESS SYSTEM FOR FORESTRY MACHINE

(75) Inventor: Jason L. Pellymonter, Dubuque, IA (US)

(73) Assignee: Deere & Company, Moline, IL (US)

(*) Notice: Subject to any disclaimer, the term of this patent is extended or adjusted under 35 U.S.C. 154(b) by 202 days.

(21) Appl. No.: 12/237,924

(22) Filed: Sep. 25, 2008

(65) Prior Publication Data
US 2010/0071520 A1    Mar. 25, 2010

(51) Int. Cl.
*A01G 23/08* (2006.01)
*B23Q 15/00* (2006.01)
(52) U.S. Cl. .......... 144/336; 144/356; 144/394; 83/76
(58) Field of Classification Search .......... 144/335, 144/336, 356, 382, 391–394, 400–404, 411, 144/4.1, 34.1, 34.5; 83/74, 76, 639.1, 796, 83/801
See application file for complete search history.

(56) References Cited

U.S. PATENT DOCUMENTS

| | | |
|---|---|---|
| 4,326,415 A | 4/1982 | Lee |
| 4,434,827 A | 3/1984 | Franklin |
| 4,644,832 A | 2/1987 | Smith |
| 5,559,725 A | 9/1996 | Nielson et al. |
| 5,833,010 A | 11/1998 | Scott et al. |
| 5,901,535 A | 5/1999 | Duckinghaus et al. |
| 6,014,996 A | 1/2000 | Egging et al. |
| 6,041,683 A * | 3/2000 | Timperi et al. .......... 83/76 |
| 6,186,198 B1 | 2/2001 | Holmes |
| 6,378,408 B2 | 4/2002 | Smith |
| 6,382,062 B1 * | 5/2002 | Smith .......... 83/74 |
| 6,553,299 B1 | 4/2003 | Keller et al. |
| 6,609,357 B1 * | 8/2003 | Davis et al. .......... 56/10.2 A |
| 6,702,666 B2 | 3/2004 | Ho et al. |
| 6,892,517 B2 | 5/2005 | Adams et al. |
| 7,011,124 B1 | 3/2006 | Morey |
| 7,017,460 B2 * | 3/2006 | Virvalo et al. .......... 83/13 |
| 7,320,349 B2 | 1/2008 | Gatz |
| 7,451,790 B2 * | 11/2008 | Vallebrant et al. .......... 144/4.1 |
| 2004/0053663 A1 | 3/2004 | Paulsen et al. |
| 2004/0251730 A1 | 12/2004 | Steffen et al. |
| 2007/0034294 A1 | 2/2007 | Chapman |
| 2008/0230148 A1 * | 9/2008 | Waggoner .......... 144/23 |

OTHER PUBLICATIONS

Wheeled Feller Bunollets brochure (16 pages).
Statement of Admitted Prior Art (1 page).
Wheeled Feller Bunchers Brochure (16 pages) (Feb. 2006).
Final Rejection in U.S. Appl. No. 11/688,956, dated Feb. 24, 2010, (16 pages).
Non-Final Rejection in U.S. Appl. No. 11/688,956, dated Oct. 20, 2009, (12 pages).

* cited by examiner

*Primary Examiner* — Shelley Self (57) ABSTRACT

A saw speed readiness system for use with a forestry machine comprises a controller configured to receive a threshold selection signal, and change a speed readiness threshold from a first saw speed to a second saw speed in response to the threshold selection signal, the speed readiness threshold representing a non-zero saw speed above which a disk saw is considered to be ready for a tree-felling operation but below which the disk saw is considered not to be ready for the tree-felling operation. An associated method is disclosed.

7 Claims, 6 Drawing Sheets

SAW SPEED READINESS SYSTEM FOR FORESTRY MACHINE

FIELD OF THE DISCLOSURE

The present disclosure relates to forestry machinery, and, more particularly, to a saw speed readiness system.

BACKGROUND OF THE DISCLOSURE

There are forestry machines in the form of a feller buncher having a carrier(wheeled or tracked) and a disk saw felling head attached to the front end of the carrier. The felling head has a spinning disk saw at the bottom of the felling head. A plurality of cutting teeth is mounted to the periphery of the spinning disk saw at spaced-apart intervals.

The disk saw is massive and acts as a flywheel which is spun up to operating speed by a hydraulic pump and motor circuit. The disk saw fells trees by kinetic energy, not hydraulic power. Thus, rotational speed of the disk saw is needed and recovery of rotational speed is important to the ability to fell the next tree. The felling operation pulls down the speed of the disk saw after cutting through the tree. The longer the operator must wait for the disk saw to return to operating speed, the less productive the felling operation. Depending upon the extent of speed loss, the disk saw may take several seconds to recover to operating speed.

Such forestry machines typically indicate speed of the disk saw by measuring the pressure change of the hydraulic fluid on a mechanical gauge; that is, high pressure indicates low, increasing speed and low pressure indicates high, steady state operating speed or a "ready to fell" condition. Such gauges are somewhat vulnerable to damage, can leak, and may be difficult to see. A tachometer may also be used, but is likewise hard to see and interpret.

SUMMARY OF THE DISCLOSURE

According to an aspect of the present disclosure, there is provided a saw speed readiness system for use with a forestry machine. The forestry machine comprises a disk saw felling head, and the disk saw felling head comprises a disk saw rotatable at a variable speed. The saw speed readiness system comprises a controller configured to receive a threshold selection signal, and change a speed readiness threshold from a first saw speed to a second saw speed in response to the threshold selection signal. The speed readiness threshold represents a non-zero saw speed above which the disk saw is considered to be ready for a tree-felling operation but below which the disk saw is considered not to be ready for the tree-felling operation. An associated method is disclosed.

In this way, the speed readiness threshold can be changed to accommodate various timber conditions, such as, for example, trees of different diameters and/or trees of different hardness levels. In such a case, a lower speed readiness threshold may be useful with smaller-diameter and/or softer wood trees, whereas a higher speed readiness threshold may be useful with larger-diameter and/or harder wood trees to ensure that the disk saw is able to cut through the full diameter of the tree so as to minimize tree fiber damage due to splintering of the base of the tree, or even machine damage, that could otherwise result from a saw speed is that is too low.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
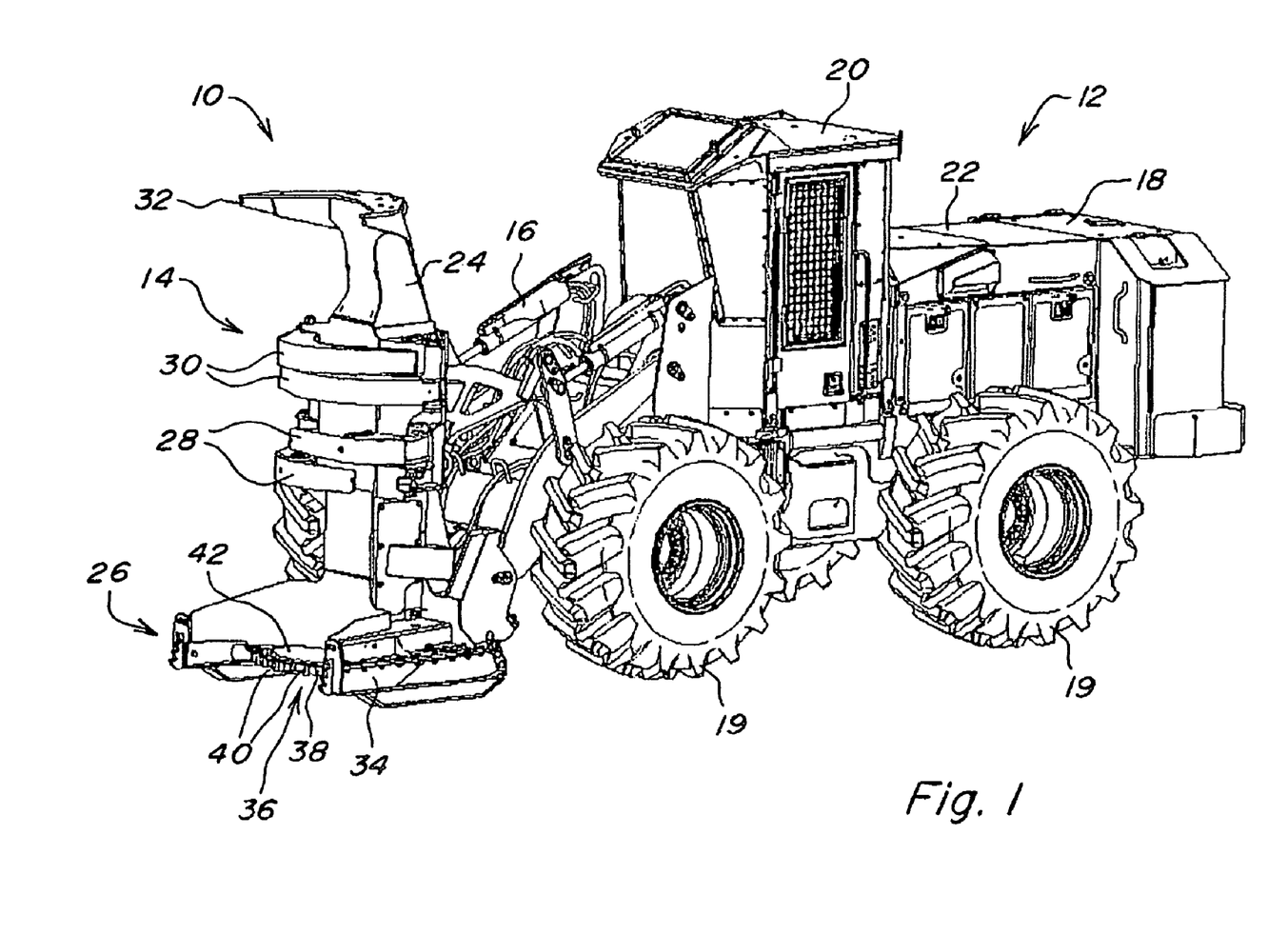
FIG. 1 is a front, perspective view of a forestry machine in the form of a feller buncher including a carrier and a disk saw felling head attached to the front of the carrier.

Referring to FIG. 1, there is shown an exemplary embodiment of a forestry machine 10. In this embodiment, the forestry machine 10 takes the form of a feller buncher including a carrier 12 and a disk saw felling head 14 attached to the front of the carrier 12. The carrier 12 may be, for example, wheeled, as shown, for example, in FIG. 1, or tracked. In general, the forestry machine 10 fells, accumulates, and transports to a staging area a number of trees in an area to be harvested.

The carrier 12 has a front section 16 and a rear section 18, which are articulated to one another for articulated steering of the carrier 12. A pair of hydraulic steering cylinders extends between the front and rear sections 16, 18 to pivot the front section 16 relative to the rear section 18 about a vertical axis at the articulation joint. Each section 16, 18 has left and right ground-engaging wheels 19. In a tracked carrier, the wheels on each side of the carrier would be replaced by a track. The rear section 18 contains the operator station 20, from which a human operator can operate the machine 10, and an engine compartment 22 housing the engine of the machine 10.

The exemplary embodiment of the disk saw felling head 14 includes a frame 24 carrying a saw section 26, accumulator arms 28, gathering arms 30, and a horn 32. Accumulator arms 28, gathering arms 30, and horn 32 are of conventional design and described further herein.

Saw section 26 includes a housing 34 and a rotatable disk saw 36 mounted for rotation about its axis of rotation 37 within the housing 34 at a variable saw speed. Saw 36 includes a massive rotating disk 38 and a plurality of cutting teeth 40 spaced apart around the periphery thereof for felling a selected tree. The disk 38 is positioned and rotates below a stationary shelf 42. Teeth 40 extend upwardly around the edge of the shelf 42 so that the trees may be effectively felled and placed upon the shelf 42. Saw 36 is driven rotationally by a hydraulic motor (not shown). During operation, the trees are felled with the saw 36 in a cutting zone thereof, exposed outside the housing 34 at the front of the saw section 26, and are positioned on top of the non-rotating shelf 42. The felled trees are gathered and accumulated on the shelf 42 using the gathering arms 30 and accumulator arms 28.

Figure 2:
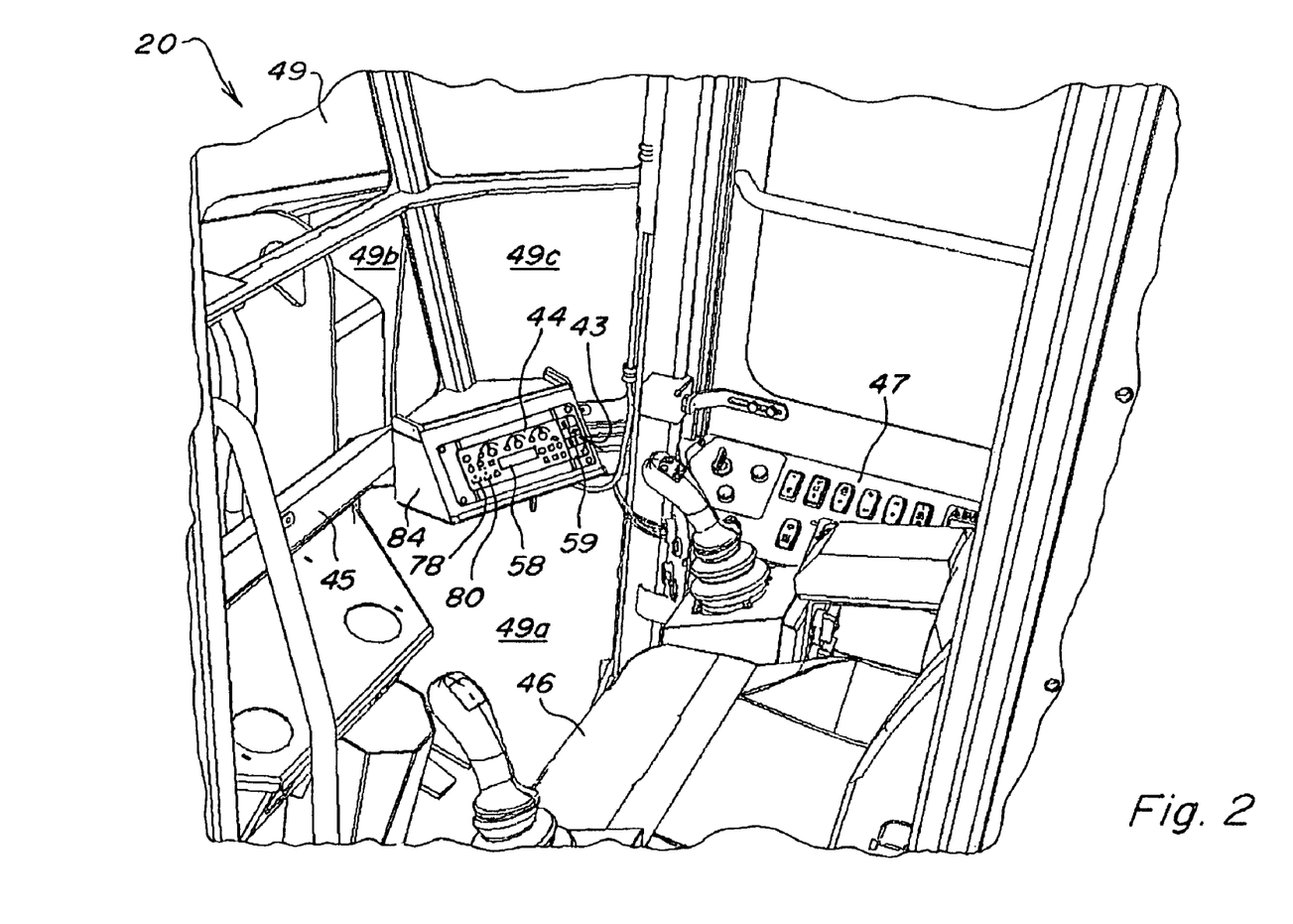
FIG. 2 is a perspective view showing an operator interface mounted toward the front of the interior region of the operator station in a corner region.
Figure 3:
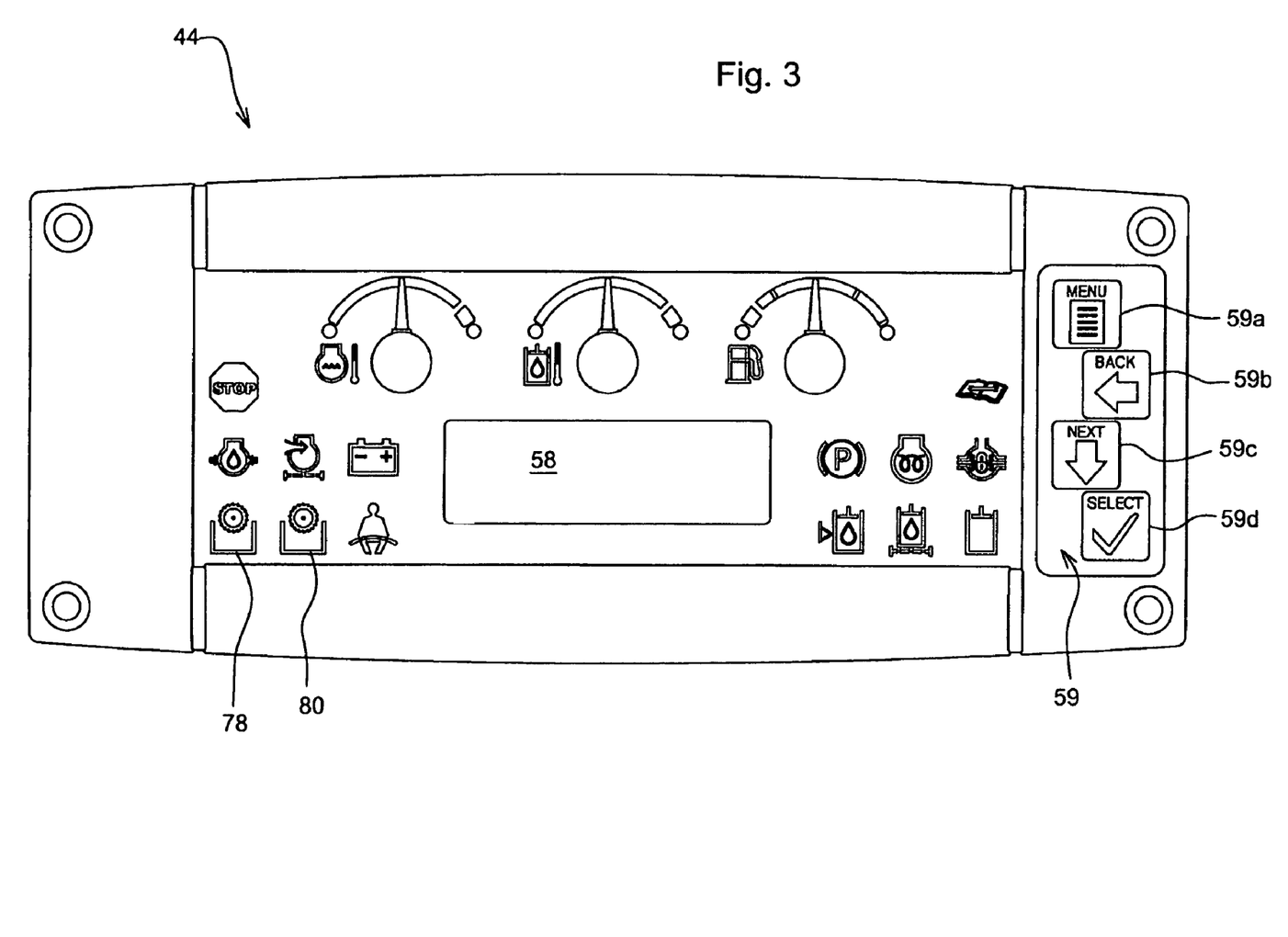
FIG. 3 is enlarged elevation view of the operator interface.
Figure 4:
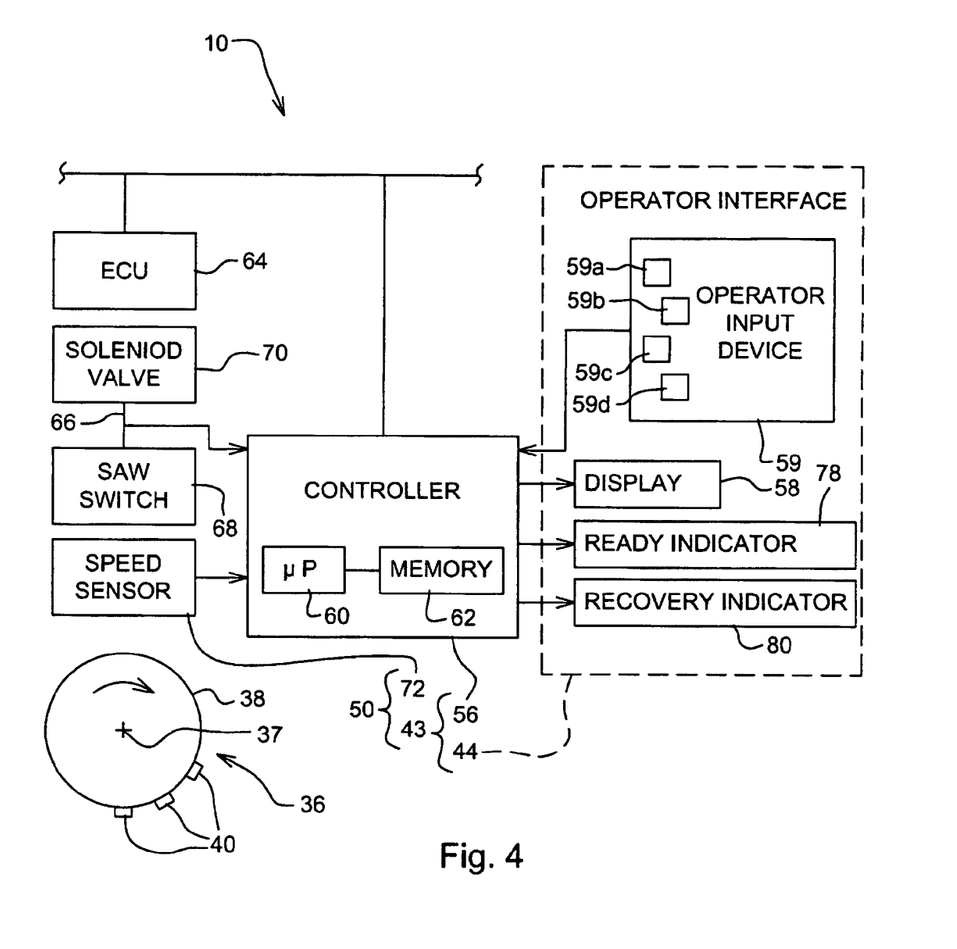
FIG. 4 is a schematic view showing a saw speed readiness system of the forestry machine.

Referring to FIGS. 2-4, there is shown a monitor 43 (which may be referred to as a standard display monitor, or SDM). The monitor 43 has an operator interface 44 and an electronic controller 56 (FIG. 4) electrically coupled (e.g., hard-wired) to the operator interface 44 and the electrical components thereof and integrated with the operator interface 44 to provide a mountable package (or "brick").

As shown in FIG. 2, the monitor 43 is mounted in the operator station 20 for ready access to and visualization of the operator interface 44 by a human operator seated in a seat 46 of the operator station 20. Exemplarily, the monitor 43 is mounted in a corner region at the front and a side (e.g., the right side) of the operator station 20. More particularly, the monitor 43 is attached to an enclosure 84, made, for example, of sheet metal, so as to be received therein with the operator interface 44 exposed outside the enclosure 84 for use by the operator. The enclosure 84 is attached to a frame 45 of the operator station between a lower panel 49*a* and window panes 49*b*, 49*c* of a front wall 49 of the operator station 20. The operator interface 44 is separate from the seat 46, a side console 47 with its control switches, and two control joysticks 48 or other type of control devices for controlling propulsion and steering of the machine 10 and functions associated with the head 14 (e.g., raising and lowering head 14, rotating head 14, opening and closing arms 28, 30). It is to be appreciated that the controller 56 may be mounted in a variety of other locations.

As shown in FIG. 3, the operator interface 44 has a number of indicators, a display 58 (e.g., a dot-matrix display), and an operator input device 59, discussed in more detail below. The controller 56 (FIG. 4) is electrically coupled to (e.g., hardwired), and arranged in communication with, the operator interface 44 and its indicators, display 58, and operator input device 59.

Referring to FIG. 4, the forestry machine 10 includes a saw speed readiness system 50 configured to indicate the speed readiness of the disk saw 36 for a tree-felling operation. More particularly, the system 50 is configured to indicate whether the saw speed of the disk saw 36 is above or below a speed readiness threshold. The speed readiness threshold represents a non-zero saw speed above which the disk saw 36 is considered to be ready for a tree-felling operation but below which the disk saw 36 is considered not to be ready for the tree-felling operation. As such, if the saw speed is above the speed readiness threshold, the operator may proceed to fell a tree, whereas, if the saw speed is below the speed readiness threshold, the operator is to wait until the saw speed has increased to at least the speed readiness threshold (i.e., until the saw 36 has recovered), after which the operator may proceed with a tree-felling operation.

The saw speed readiness system 50 includes the monitor 43 with its controller 56. The controller 56 is configured, for example, as an electronic controller having a processor 60 (e.g., a microprocessor) and a memory 62 (e.g., non-volatile) coupled to the processor 62. The memory 62 has stored therein instructions which, when executed by the processor 60, cause the processor 60 to perform the various functions of the controller 56. The controller 56 is, for example, a standalone controller. In another embodiment, the controller 56 may be incorporated into a controller used for other functions. To that end, it will be appreciated that the logic used for the saw speed readiness system 50 may be accomplished with any desired combination of electronic hardware and/or software.

Before indicating the speed readiness of the saw 36, the system 50 first confirms both that the engine of the machine 10 is running and that the saw 36 is powered. If both conditions are satisfied, the system 50 will proceed to indicate the readiness of the saw 36. However, if either condition is not satisfied, the system 50 will not indicate the readiness of the saw 36.

Regarding the engine condition, the controller 56 receives an engine signal in the form of, for example, a CAN message from an engine control unit 64 via a communications bus (e.g., CAN bus), the engine signal representative of the speed of the engine as sensed by an engine speed sensor of the machine 10 (not shown). If the engine speed is at least 300 revolutions per minute (RPM) for at least 0.5 second, the controller 56 determines that the engine is running and that the engine condition is satisfied. However, if the engine speed drops below 200 RPM for more than 100 milliseconds, the controller 56 determines that the engine is not running and that the engine condition is not satisfied.

Regarding the saw condition, the controller 36 is coupled to an electrical line 66 extending between a saw switch 68 and a solenoid valve 70. The saw switch 68 is, for example, a rocker switch on the side console 47, and controls energization of the solenoid valve 70. When the switch 68 is closed, voltage is applied to the solenoid valve 70 to energize it so that the valve 70 allows flow of hydraulic fluid from a hydraulic pump on board the carrier 12 to a hydraulic pump on board the head 14, thereby powering the saw 36. When the switch 68 is open, voltage is not applied to the solenoid valve 70 thereby de-energizing it so that the valve 70 blocks flow of hydraulic fluid from the pump to the motor and the saw 36 is no longer driven. The controller 56 thus receives a saw power signal from the line 66, representing whether the saw 36 is powered on or off. If the saw is powered on, the controller 56 determines that the saw condition is satisfied, whereas, if the saw is powered off, the controller 56 determines that the saw condition is not satisfied.

In another embodiment, employment of the saw condition may be optional, at the discretion of the operator. In such a case, the monitor 43 may be programmed so as to allow the operator to enable or disable the saw condition. When enabled, the system 50 would require that the saw condition be satisfied, in addition to the engine condition, before proceeding to indicate the speed readiness of the saw 36. When disabled, the system 50 would ignore the saw condition and proceed to indicate the speed readiness of the saw 36 if the engine condition is satisfied. In another embodiment, the saw condition may be eliminated altogether.

The saw speed readiness system 50 has a speed sensor 72. The speed sensor 72 senses the speed of rotation of the saw 36 about its axis 37 (i.e., the saw speed), and outputs a speed signal representative of the saw speed.

Figure 5:
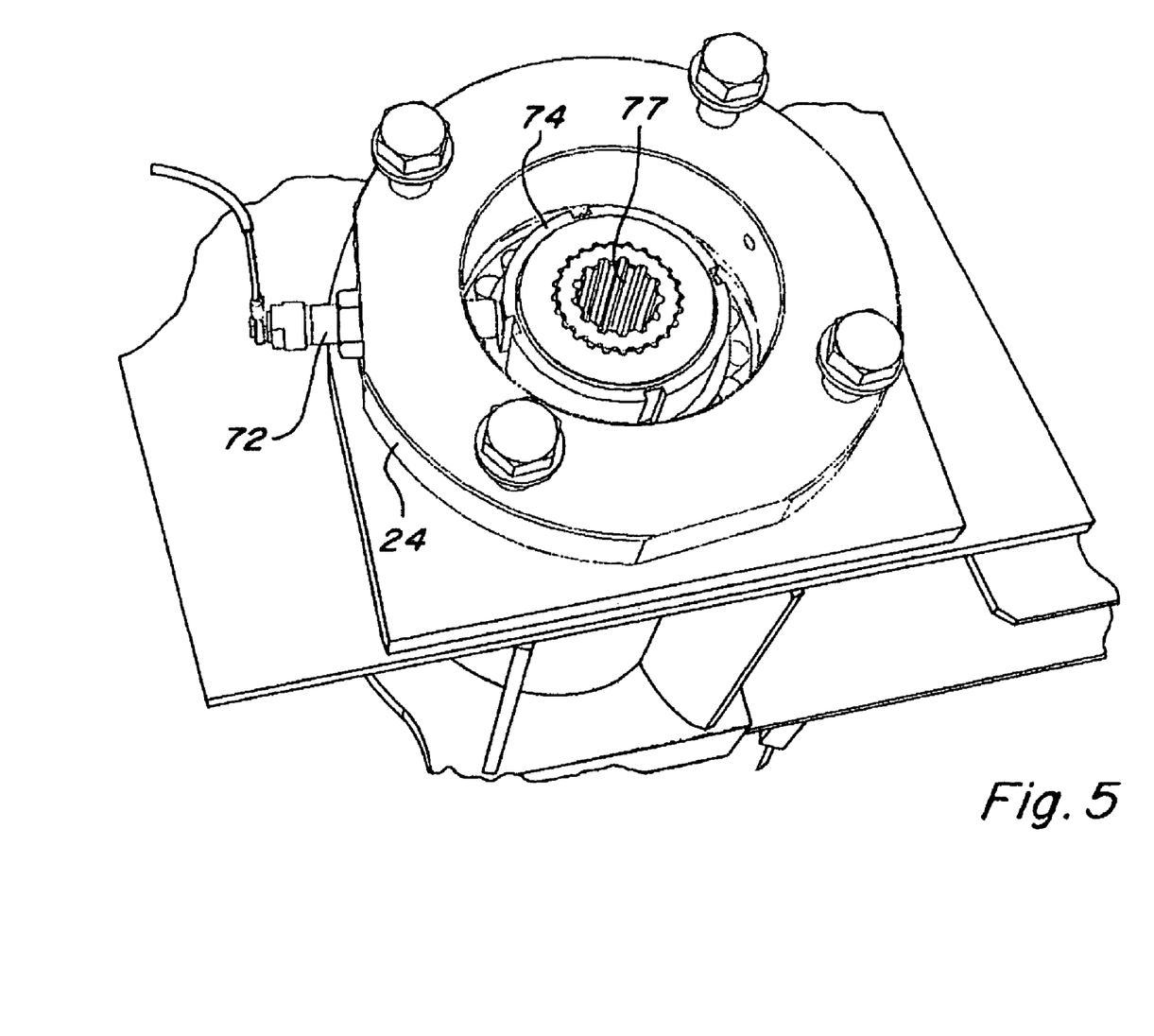
FIG. 5 is a perspective view showing a speed sensor for sensing the speed of a disk saw of the disk saw felling head.

Referring to FIG. 5, the speed sensor 72 is configured, for example, as a variable reluctance speed sensor (also known as a magnetic pick-up sensor) attached to the frame 24 of the disk saw felling head 14. In such a configuration, the speed sensor senses rotation of a rotary sensor target 74 mounted for rotation with the saw 36 about the rotation axis 37 and having, for example, four notches formed about its periphery at evenly spaced intervals, such speed of rotation of the sensor target 74 being representative of the saw speed. The target 74 is, for example, a piece of steel attached to a conical shaft 76 interconnecting the output shaft of the hydraulic motor (not shown) via splines 77 and the disk saw 36. In an example, the variable reluctance speed sensor 72 is available from Ametek, Inc., Vehicular Instrumentation Systems of Grand Junction, Colo., as part number 19626249 with a part name of "Sensor 3.50 w/Studs." Other types of sensors outputting a speed signal representative of the saw speed may also be used, such as optical sensors, etc.

Referring back to FIG. 4, the controller 56 determines whether the saw 36 is ready for a tree-felling operation based upon predetermined readiness criteria, which is dependent upon the saw speed and the speed readiness threshold. The controller 56 is electrically coupled (e.g., hard-wired) to the speed sensor 72 so as to be arranged in communication therewith to receive the speed signal from the speed sensor 72. The speed readiness threshold is stored in the memory 62 of the controller 56.

The controller 56 compares the saw speed to the speed readiness threshold. If the saw speed is below the speed readiness threshold, the controller 56 determines that the readiness criteria is not satisfied, meaning that the saw 36 is considered not to be ready for a tree-felling operation. If the saw speed is at or above the speed readiness threshold, the controller 56 determines that the readiness criteria is satisfied, meaning that the saw 36 is considered to be ready for a tree-felling operation.

As shown best in FIG. 3, the operator interface 44 has a ready indicator 78 and a recovery indicator 80, which cooperate to provide a speed readiness indicator of the system 50. The controller 56 is electrically coupled (e.g., hard-wired) to, and arranged in communication with, the speed readiness indicator and the ready and recovery indicators 78, 80 thereof. If the saw speed is at or above the speed readiness threshold, the controller 56 outputs a ready signal to the ready indicator 78 activating the ready indicator 78 so as to indicate that the saw 36 is ready for a tree-felling operation, during which time the recovery indicator 80 is de-activated. If the saw speed is below the speed readiness threshold, the controller 56 outputs a recovery signal to the recovery indicator 80 activating the recovery indicator 80 so as to indicate that the saw 36 is not yet ready for a tree-felling operation.

Exemplarily, each of the indicators 78, 80 is a visual indicator, such as, for example, a light source (e.g., light-emitting diode). In such a case, the ready signal illuminates the ready indicator 78 and the recovery signal illuminates the recovery indicator 80. The indicators 78, 80 are different colors from one another. For example, the ready indicator 78 is a green light emitting diode, and the recovery indicator 80 is an amber light emitting diode. In another embodiment, each indicator 78, 80 may be an incandescent light with a green or amber lens, as applicable.

In another embodiment, the speed readiness indicator may have the ready indicator 78 but not the recovery indicator 80. In such a case, activation of the ready indicator 78 (e.g., green illumination of indicator 78) would indicate that the speed readiness threshold has been reached, while de-activation of the ready indicator 78 (e.g., extinguishment of indicator 78) would indicate that the speed readiness threshold has not been reached.

In another embodiment, the speed readiness indicator may have a single light source indicator in the form of, for example, a two-color light source. In such a case, the light source may illuminate green at or above the speed readiness threshold and illuminate amber below the speed readiness threshold in response to a respective signal from the controller 56.

In another embodiment, the speed readiness indicator may have a single light source indicator, which can be energized by a signal from the controller 56 with a variable frequency indicating whether the speed readiness threshold has been reached. For example, such a light source indicator can be turned on an off with a frequency which increases as the saw speed increases, and can be continuously illuminated when the saw 36 is at or above the speed readiness threshold. That is, the single light source indicator can be energized with a lower frequency indicating a slower saw speed, a higher frequency indicating a faster saw speed, and a steady on condition indicating that the saw speed is at or above the readiness threshold.

In another embodiment, the speed readiness indicator may have a single visual indicator in the form of a light bar with a plurality of vertically arranged, horizontally elongated lights. In such a case, the controller 56 signals one or more top lights so that they illuminate a first light color, such as green to indicate that the saw speed is at or above the speed readiness threshold. The controller 56 further signals one or more bottom lights so that they illuminate a second light color, such as amber, to indicate that saw speed is below the speed readiness threshold.

The speed readiness indicator may thus take a wide variety of visual or other forms (e.g., audible). In the case of a visual form, the speed readiness indicator is located in an area of peripheral vision of an operator so as to be recognizable by the operator without taking the eyes off the task at hand. As such, the speed readiness indicator is configured so that the operator can know without directly observing the speed readiness indicator whether the saw 36 is ready for a tree-felling operation. As shown best in FIG. 3, the speed readiness indicator, in the form of, for example, the ready and recovery indicators 78, 80, is included in the monitor 43 in a lower left-hand corner of the operator interface 44 toward the center of the operator station 20 relative to the display 58 and an operator input device 59.

The speed readiness threshold stored in the memory 62 can be changed to accommodate various timber conditions. Such timber conditions include trees of different diameters and/or trees of different hardness levels. In such a case, a lower speed readiness threshold may be useful with smaller-diameter and/or softer wood trees, whereas a higher speed readiness threshold may be useful with larger-diameter and/or harder wood trees to ensure that the disk saw is able to cut through the full diameter of the tree so as to minimize tree fiber damage due to splintering of the base of the tree, or even machine damage, that could otherwise result from a saw speed is that is too low.

Exemplarily, the speed readiness threshold may be set to a default saw speed at the time of manufacture of the carrier 12. This default saw speed may be, for example, 950 RPM, while the maximum saw speed may be between 1150 RPM and 1200 RPM. To fell relatively large and/or hard trees, the speed readiness threshold can be increased. For example, to fell elm trees having a diameter between about 18 inches and about 20 inches, the speed readiness threshold can be increased to at least 1000 RPM, such as to a saw speed between 1000 RPM and 1050 RPM. To fell relatively small and/or soft trees (e.g., for pulp), the speed readiness threshold can be decreased. For example, to fell pine trees having a diameter between about 6 inches and about 20 inches, the speed readiness threshold can be decreased to 750 RPM.

Referring to FIGS. 6A-6J, the speed readiness threshold is selectable by the operator using the display 58 and the operator input device 59. As shown best in FIG. 3, the operator input device 59 may have a number of touch-sensitive push buttons, such as, for example, a menu button 59*a*, a back button 59*b*, a next button 59*c*, and a select button 59*d*. A menu map is stored in the memory 62. The controller 56 is configured to navigate through the screen map in response to actuation of the buttons 59*a*-59*d*.

Upon start-up of the machine 10, the controller 56 outputs a display signal commanding the display 58 to display a start-up screen (not shown). The display 58 displays the start-up screen for a brief, start-up period of time (e.g., a few seconds) in response to receipt of that display signal.

Figure 6A:
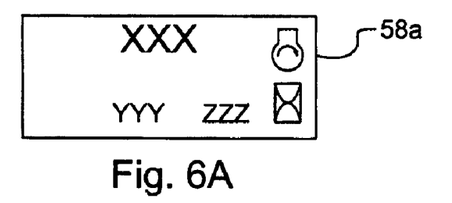
FIGS. 6A-6J show a number of screens that may be displayed on a display of the saw speed readiness system.

Referring to FIG. 6A, upon expiration of the start-up time period, the controller 56 outputs a display signal commanding the display 58 to display a run-time screen 58*a*. The display 58 displays the run-time screen 58*a* in response to receipt of that display signal. In the run-time screen 58*a*, the engine speed ("XXX") is displayed. Further, the value ("YYY") of another parameter ("ZZZ") is also displayed. The parameter ZZZ is selectable through the main menu among a number of parameters, such as, for example, accumulated machine hours of the carrier 12, voltage, accumulated job hours of a particular job, and saw speed.

Figure 6B:
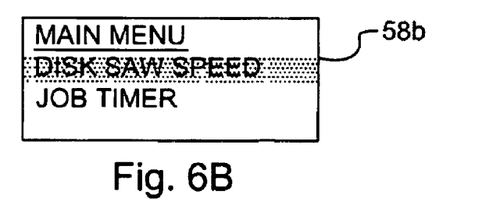

Referring to FIG. 6B, if the operator presses the menu button 59a while in the run-time screen 58a, the controller 56 outputs a display signal commanding the display 58 to display a main menu screen 58b. The display 58 displays the main menu screen 58b in response to receipt of that display signal. In the main menu screen 58b, the operator can scroll through a number of menu items by pressing either the back button 59b to scroll up the main menu or the next button 59c to scroll down the main menu.

As the operator scrolls through the menu of any screen, one menu item is highlighted at a time, indicating that such menu item can be selected by pressing the select button 59d. Such highlighting can occur in a wide variety of ways. For example, the text of a selectable menu item may become white against a dark background, while the text of non-selectable menu items remains dark against a lighter background. For purposes of illustration, the text of a selectable menu item remains dark against a gray background.

To proceed with changing the speed readiness threshold, while in the main menu screen 58b, the operator scrolls to the "Disk Saw Speed." When that item is highlighted, the operator presses the select button 59d to select it.

Figure 6C:
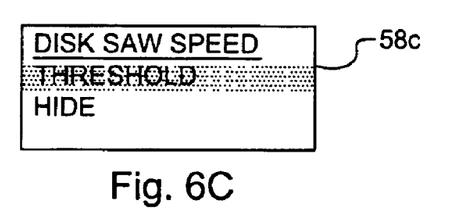

Referring to FIG. 6C, in response to selection of the "Disk Saw Speed" item in screen 58b, the controller 56 outputs a display signal commanding the display 58 to display the screen 58c. The display 58 displays the screen 58c in response to receipt of that display signal. In the screen 58c, the operator can choose between the menu items of "Threshold" and "Hide." The "Threshold" item is highlighted in FIG. 6C and is therefore selectable by pressing the select button 59d. Selection of the "Threshold" item advances the display 58 to the screen 58d in FIG. 6D. Selection of the "Hide" item is discussed in connection with FIG. 6G.

Figure 6D:
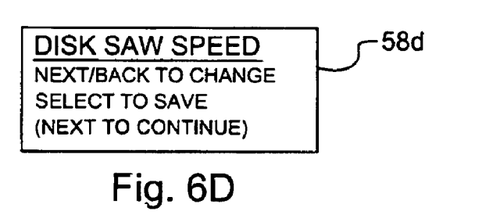

Referring to FIG. 6D, the controller 56 outputs a display signal commanding the display 58 to display the screen 58d in response to selection of the "Threshold" item in screen 58c. The display 58 displays the screen 58d in response to receipt of that display signal. Screen 58d contains instructions for changing the saw speed displayed (i.e., the display saw speed) and selecting the display saw speed as the speed readiness threshold. Pressing the next button 59c advances the display 58 to a prompt screen 58e of FIG. 6E.

Figure 6E:
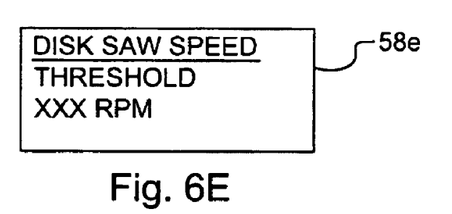

Referring to FIG. 6E, the controller 56 outputs a display signal commanding the display 58 to display the prompt screen 58e in response to pressing of any of buttons 59b, 59c, or 59d in screen 58d. The display 58 displays the prompt screen 58e with a first display saw speed in response to receipt of that display signal, prompting selection of a saw speed for the speed readiness threshold via the operator input device 59. The display 58 displays the speed readiness threshold stored in the memory 62 as the first display saw speed. If the operator is satisfied with maintaining the first display saw speed as the speed readiness threshold, the operator can press the select button 59d, maintaining that value as the speed readiness threshold and advancing the display 58 to a storage-notification screen 58f of FIG. 6F.

If the operator would like to change the speed readiness threshold, the operator presses the back button 59b to decrease the display saw speed a predetermined amount (e.g., 25 RPM) or the next button 59c to increase the display saw speed a predetermined amount (e.g., 25 RPM) until the desired value for the speed readiness threshold is displayed on the screen 58e as a second display saw speed. Once the desired display saw speed is reached, the operator can press the select button 59d so as to select the second display saw speed as the new speed readiness threshold, advancing the display 58 to the storage-notification screen 58f.

Actuation of the select button 59d in the screen 58e generates a threshold selection signal. The controller 56 receives the threshold selection signal from the select button 59d, and stores the saw speed represented thereby as the speed readiness threshold in the memory 62. The controller 56 is thus configured to change the speed readiness threshold from a first saw speed to a second saw speed in response to the threshold selection signal. In so doing, the controller 56 is configured to store in the memory 62 the first saw speed as the speed readiness threshold and, subsequently, the second saw speed as the speed readiness threshold in place of the first saw speed.

Thus, more particularly, the controller 56 is configured to output a first display signal to the display 58 commanding the display 58 to display the first display saw speed (e.g., a saw speed which may or may not be stored as the current speed readiness threshold), receive a change-display signal from the back button 59b or the next button 59c in response to actuation thereof in the screen 58e, change the first display saw speed by the predetermined amount (e.g., 25 RPM) to the second display saw speed in response to the change-display signal, output a second display signal to the display 58 commanding the display 58 to display the second display saw speed, and set the second display saw speed as the speed readiness threshold in response to the threshold selection signal generated in response to actuation of select button 59d.

Figure 6F:
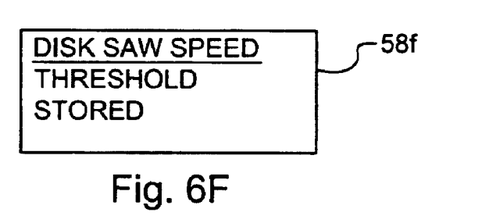

Referring to FIG. 6F, the controller 56 outputs a display signal commanding the display 58 to display the storage-notification screen 58f. The display 58 displays the screen 58f in response to receipt of that display signal. The screen 58f communicates for a predetermined period of time (e.g., two seconds) that the most recent display saw speed has been stored as the speed readiness threshold. Upon expiration of the predetermined period of time, the display 58 advances to the screen 58c.

Figure 6G:
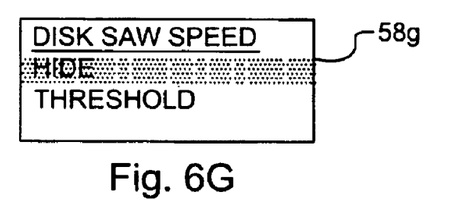

Referring to FIG. 6G, screen 58g is similar to screen 58c except that the "Hide" menu item is highlighted in response to actuation of the back button 59b or next button 59c, as the case may be. Pressing the select button 59d when the "Hide" item is highlighted causes the saw speed to be hidden from the run-time screen 58a, and advances the display 58 to the screen 58h. An operator may wish to so hide the saw speed when the disk saw felling head 14 has no saw speed sensor and is therefore not capable of sensing the saw speed.

Figure 6H:
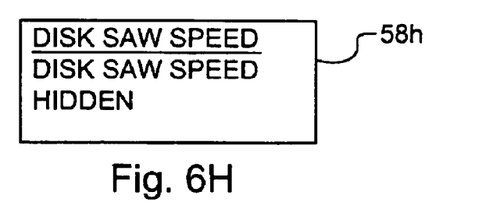

Referring to FIG. 6H, in response to selection of the "Hide" item in screen 58c, the controller 56 outputs a display signal commanding the display 58 to display the screen 58h. The display 58 displays the screen 58h for a predetermined period of time (e.g., two seconds) in response to receipt of that display signal. Screen 58h communicates that the disk saw speed has been hidden.

Figure 6I:
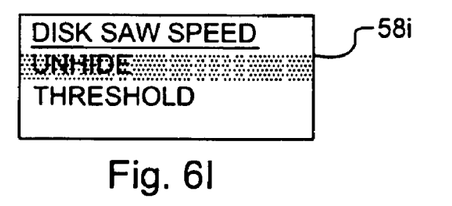

Referring to FIG. 6I, upon expiration of the predetermined period of time in screen 58h, the controller 56 outputs a display signal commanding the display 58 to display the screen 58i. The display 58 displays the screen 58i in response to receipt of that display signal. In the screen 58i, the operator is presented with the menu items of "Unhide" and "Threshold." Pressing the select button 59d when the "Unhide" item is highlighted causes the saw speed to become unhidden from the run-time screen 58a, and advances the display 58 to the screen 58j. An operator may wish to so unhide the saw speed when a disk saw felling head 14 with a saw speed sensor is attached to the carrier 12. Pressing the select button 59d when the "Threshold" item is highlighted causes the display 58 to advance to the screen 58d.

Figure 6J:
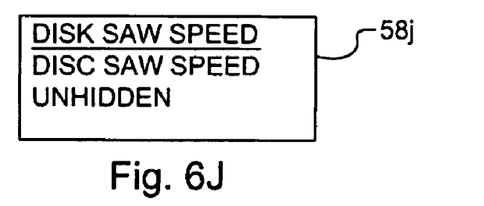

Referring to FIG. 6J, in response to selection of the "Unhide" item in screen 58i, the controller 56 outputs a display signal commanding the display 58 to display the screen 58j. The display 58 displays the screen 58j for a predetermined period of time (e.g., two seconds) in response to receipt of that display signal. Screen 58j communicates that the disk saw speed has been unhidden. Upon expiration of the predetermined period of time, the controller 56 outputs a display signal commanding the display 58 to display the screen 58g. The display 58 displays the screen 58g in response to receipt of that display signal.

During navigation through the menu map, the operator can return to the run-time screen 58a by either simply pressing the menu button 59a once or repeatedly pressing the back button 59b until the run-time screen 58a appears.

In another embodiment, the controller 56 may be configured to select the speed readiness threshold automatically dependent upon the timber conditions. In such a case, the memory 62 may have stored therein a look-up table or other representation of threshold selection criteria that selects an appropriate speed readiness threshold in response to input of one or more timber conditions (e.g., tree diameter) by the operator via, for example, the operator input device 59 or other input device (e.g., a keypad).

U.S. patent application Ser. No. 11/688,956, which was filed 21 Mar. 2007 and is titled "Speed Readiness Indicator for a Saw Head in a Tree Feller," is hereby incorporated by reference herein.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A method for use with a forestry machine, the forestry machine comprising a disk saw felling head, the disk saw felling head comprising a disk saw rotatable at a variable saw speed, the method comprising receiving a threshold selection signal, and changing a speed readiness threshold from a first saw speed to a second saw speed in response to the threshold selection signal, the speed readiness threshold representing a non-zero saw speed above which the disk saw is considered to be ready for a tree-felling operation but below which the disk saw is considered not to be ready for the tree-felling operation.

2. The method of claim 1, wherein the receiving comprises receiving the threshold selection signal in response to an operator input.

3. The method of claim 1, wherein the changing comprises storing the second saw speed as the speed readiness threshold in place of the first saw speed.

4. The method of claim 1, comprising outputting a display signal commanding display of the speed readiness threshold.

5. The method of claim 1, comprising navigating through a screen map, and outputting a display signal commanding display of a prompt screen prompting selection of a saw speed for the speed readiness threshold.

6. The method of claim 1, comprising sensing the saw speed, and indicating whether the saw speed is above or below the speed readiness threshold when the speed readiness threshold is the first saw speed and, subsequently, when the speed readiness threshold is the second saw speed.

7. The method of claim 1, comprising outputting a first display signal commanding display of a first display saw speed, receiving a change-display signal in response to an operator input, changing the first display saw speed by a predetermined amount to a second display saw speed in response to the change-display signal, and outputting a second display signal commanding display of the second display saw speed, wherein changing the speed readiness threshold comprises setting the second display saw speed as the speed readiness threshold in response to the threshold selection signal generated in response to an operator input.

* * * * *